United States Patent [19]
Lin et al.

[11] Patent Number: 5,959,636
[45] Date of Patent: Sep. 28, 1999

[54] METHOD AND APPARATUS FOR PERFORMING SATURATION INSTRUCTIONS USING SATURATION LIMIT VALUES

[75] Inventors: Derrick C. Lin, Foster City; Mehrdad Mohebbi; Kay K. Huang, both of San Jose, all of Calif.

[73] Assignee: Intel Corporation, Santa Clara, Calif.

[21] Appl. No.: 08/606,328

[22] Filed: Feb. 23, 1996

[51] Int. Cl.$^6$ ........................................... G06F 3/153
[52] U.S. Cl. ........................................... 345/501
[58] Field of Search .................. 364/DIG. 1, DIG. 2; 395/118, 126, 128, 129, 130, 131, 132, 133, 376, 501, 523, 526; 345/501, 118

[56] References Cited

U.S. PATENT DOCUMENTS

| | | | |
|---|---|---|---|
| 3,711,692 | 1/1973 | Batcher | 364/715.8 |
| 3,723,715 | 3/1973 | Chen et al. | 364/786 |
| 4,161,784 | 7/1979 | Cushing et al. | 364/748 |
| 4,393,468 | 7/1983 | New | 364/736 |
| 4,418,383 | 11/1983 | Doyle et al. | 395/307 |
| 4,498,177 | 2/1985 | Larson | 371/52 |
| 4,707,800 | 11/1987 | Montrone et al. | 364/788 |
| 4,771,379 | 9/1988 | Ando et al. | 395/800 |
| 4,989,168 | 1/1991 | Kuroda et al. | 364/715.09 |
| 5,095,457 | 3/1992 | Jeong | 364/758 |
| 5,187,679 | 2/1993 | Vassiliadis et al. | 364/786 |
| 5,231,694 | 7/1993 | Novak et al. | 395/501 |

OTHER PUBLICATIONS

B. Case, "Philips Hopes to Displace DSPs with VLIW", Microprocessor Report, pp. 12–18, Dec. 05, 1994.

Texas Instruments, "TMS320C2x User's Guide", pp. 3–2 thru 3–34; 4–1 thru 4–151, 1993.

L. Gwennnap, "New PA–RISC Processor Decodes MPEG Video", Microprocessor Report, pp. 16–17, Jan. 24, 1994.

Sun Micro., "SPARC Technology Business", Sep. 1994.

Y. Kawakami, "A Single Chip Digital Signal Processor for Voiceband Applications", IEEE, pp. 40&41, Feb. 13, 1980.

J. Shipnes, "Graphics Processing with the 88110 RISC", IEEE, pp. 169–174, 1992.

Motorola Inc., "MC88110 Second Generation RISC Microprocessor User's Manual", 1991.

Motorola Inc. "Errata to MC88110 Second Generation RISC Microprocessor User's Manual", pp. 1–11, 1992.

Motorola Inc., "MCC88110 Programmer's Reference Guide", pp. 1–5, 1992.

Intel, "i860 Microprocessor Family Programmer's Reference Manual", Ch. 1,3,8 and 12, 1992.

Ruby B. Lee, "Accelerating Mutimedia with Enhanced Microprocessors", IEEE Micro, pp. 22–32, Apr. 1995.

Intel, "Pentium Processor User's Manual, vol. 3: Architecture & Programming Manual", Ch. 1,3,4,6,8 and 18, 1993.

N. Margulis, "i860 Microprocessor Architecture", Ch. 6,7, 8,10 and 11, 1990.

*Primary Examiner*—Robert B. Harrell
*Attorney, Agent, or Firm*—Blakely, Sokoloff, Taylor & Zafman

[57] ABSTRACT

A method and apparatus for processing saturation instructions in a computer system. A first logic device is coupled to receive at least one carry signal and generate an output signal in response to the carry signal. A second logic device is coupled to the first logic device. The second logic device is capable of selecting between a first plurality of input signals to generate an output signal. The output signal from the second logic device represents the result of the saturation instruction. A third logic device is coupled to the second logic device. The third logic device is coupled to receive a second plurality of input signals and generates an output signal. The second plurality of input signals include limit values corresponding to particular data formats.

15 Claims, 7 Drawing Sheets

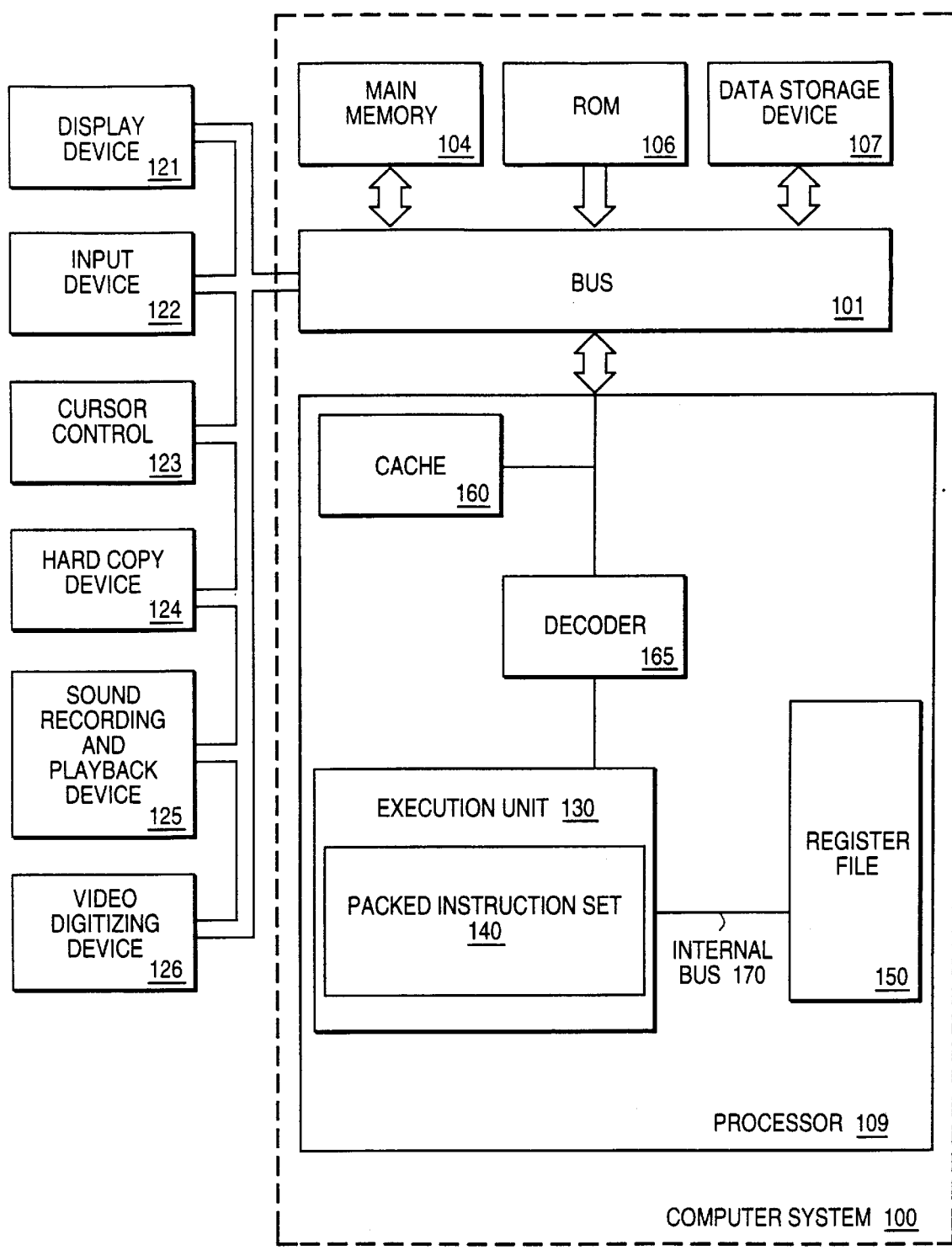
FIG_1

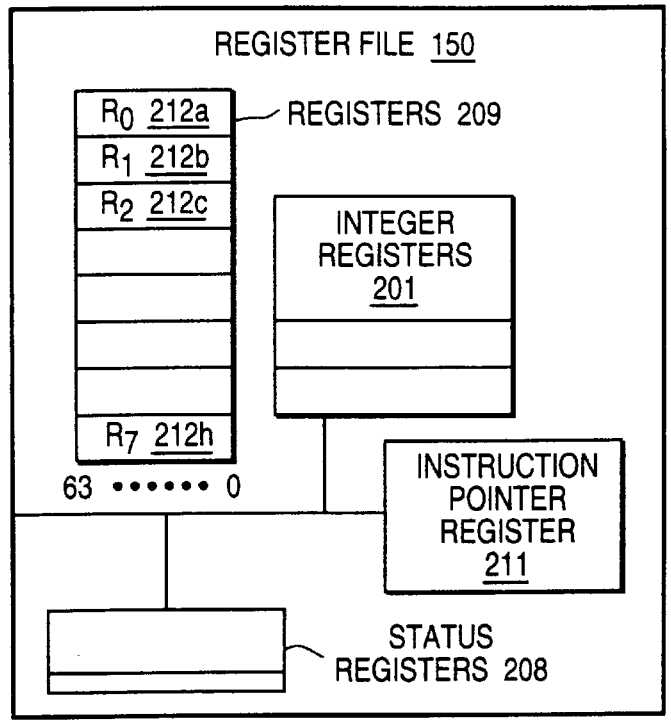
FIG_2
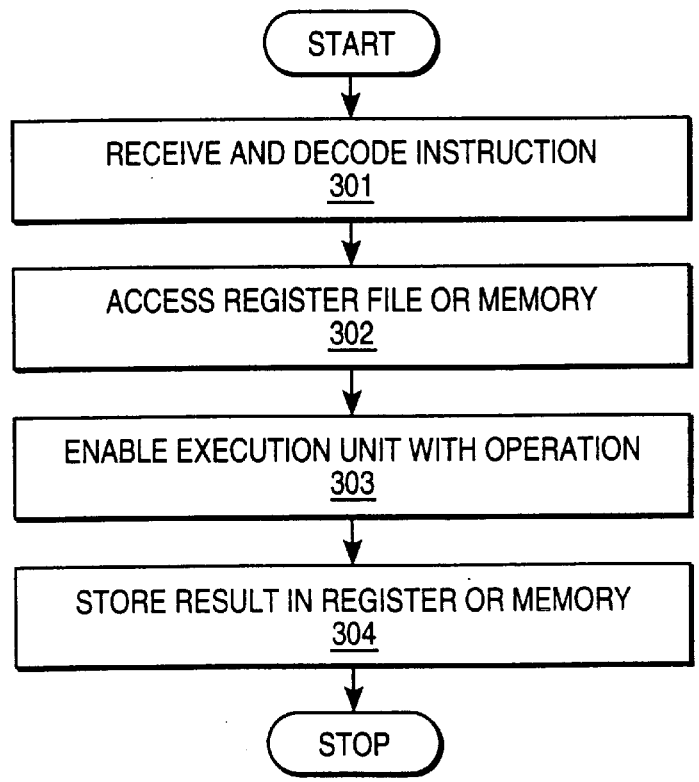
FIG_3

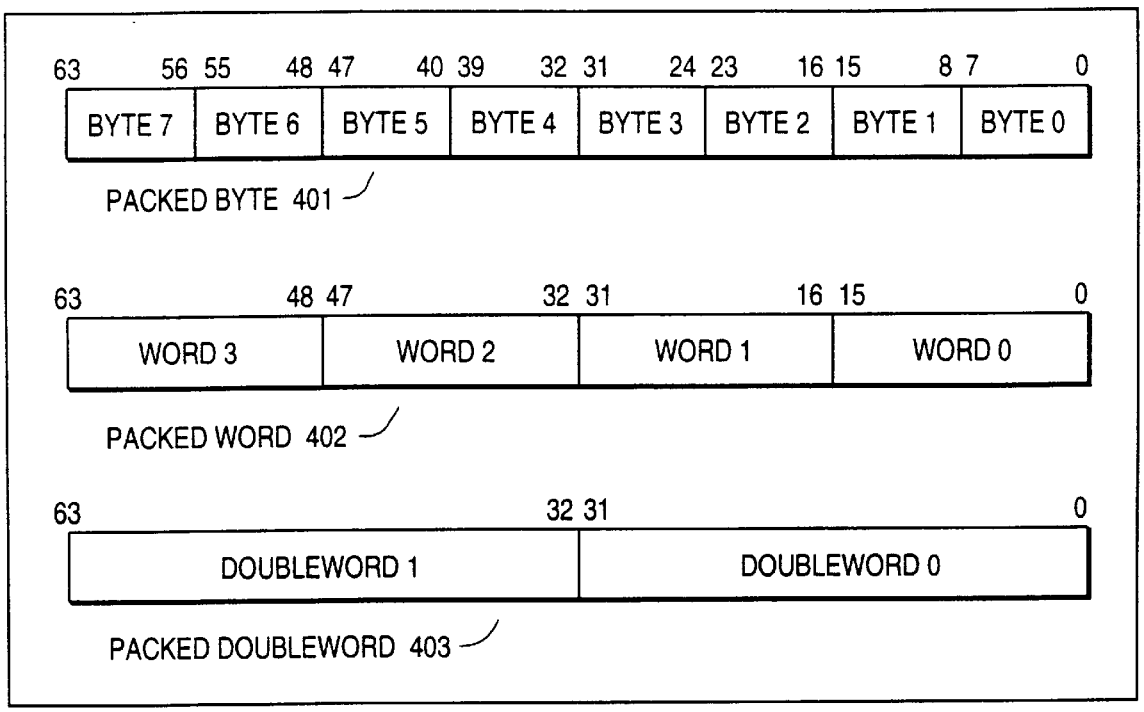
FIG_4
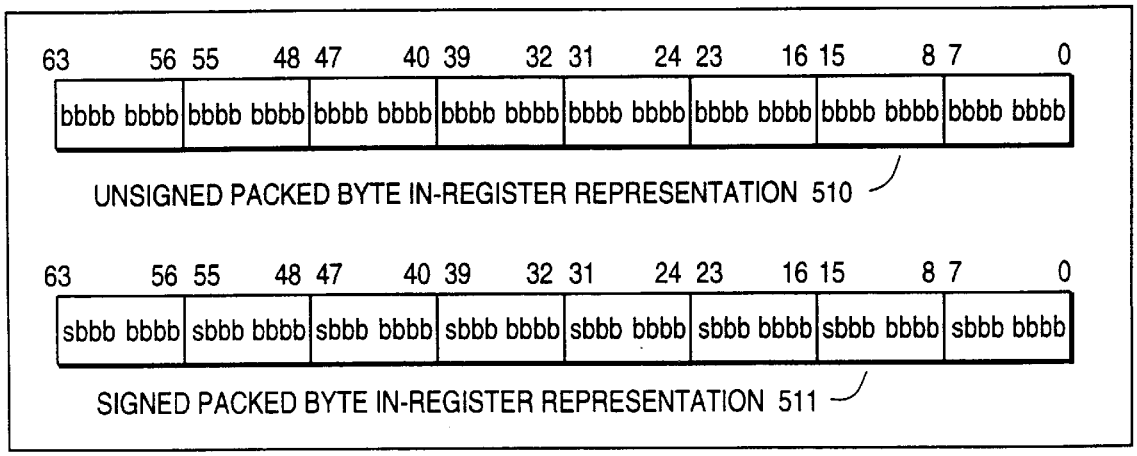
FIG_5A

FIG. 5B

Unsigned packed word in-register representation 512

Signed packed word in-register representation 513

FIG. 5C

Unsigned packed doubleword in-register representation 514

Signed packed doubleword in-register representation 515

```
         CARRY IN                CARRY OUT   CARRY IN
         ↙                       ↙           ↙
    0  1  0  1                     0  1  0  1
    0  1  1  1                     1  1  1  1
    ─────────                    ─────────────
    1  1  0  0                   1  0  1  0  0
```
FIG_6A  FIG_6B
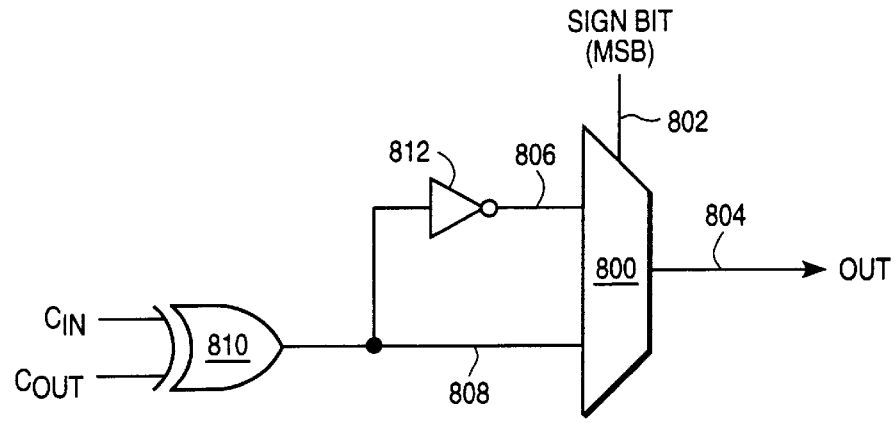
FIG_8
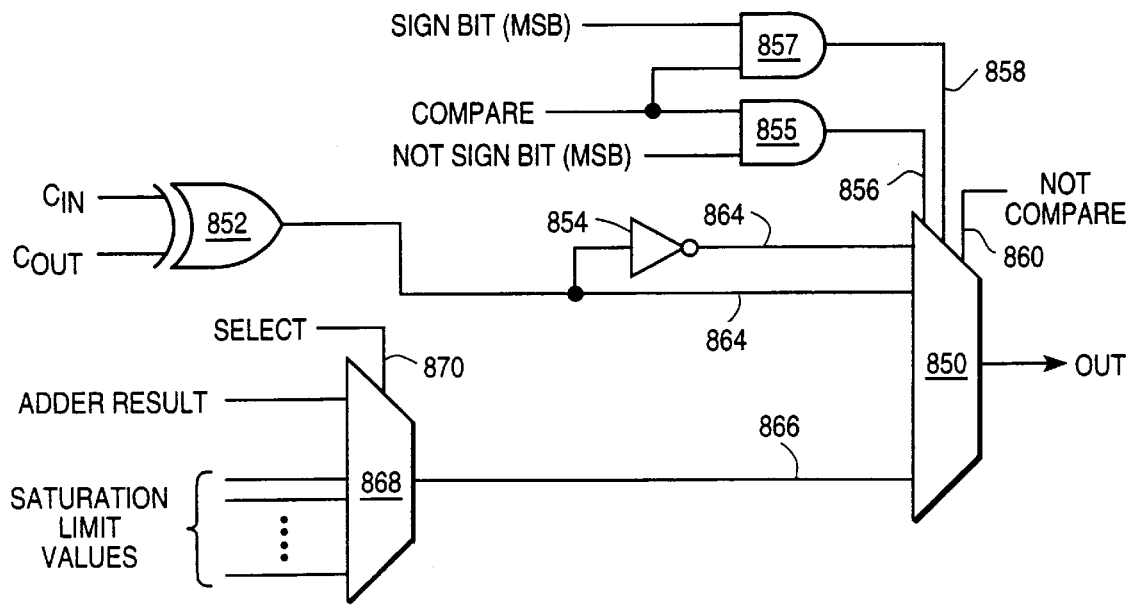
FIG_9

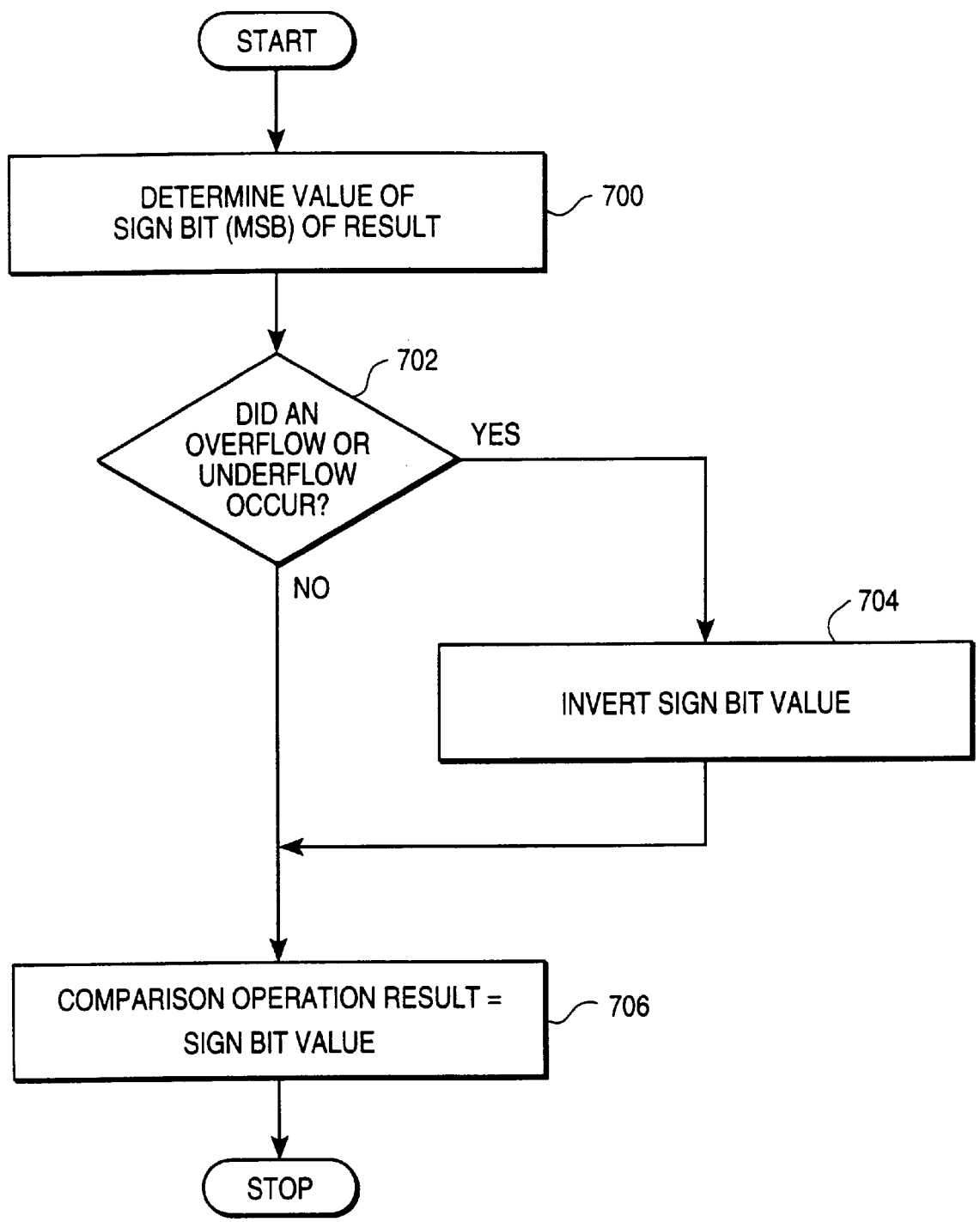
FIG_7

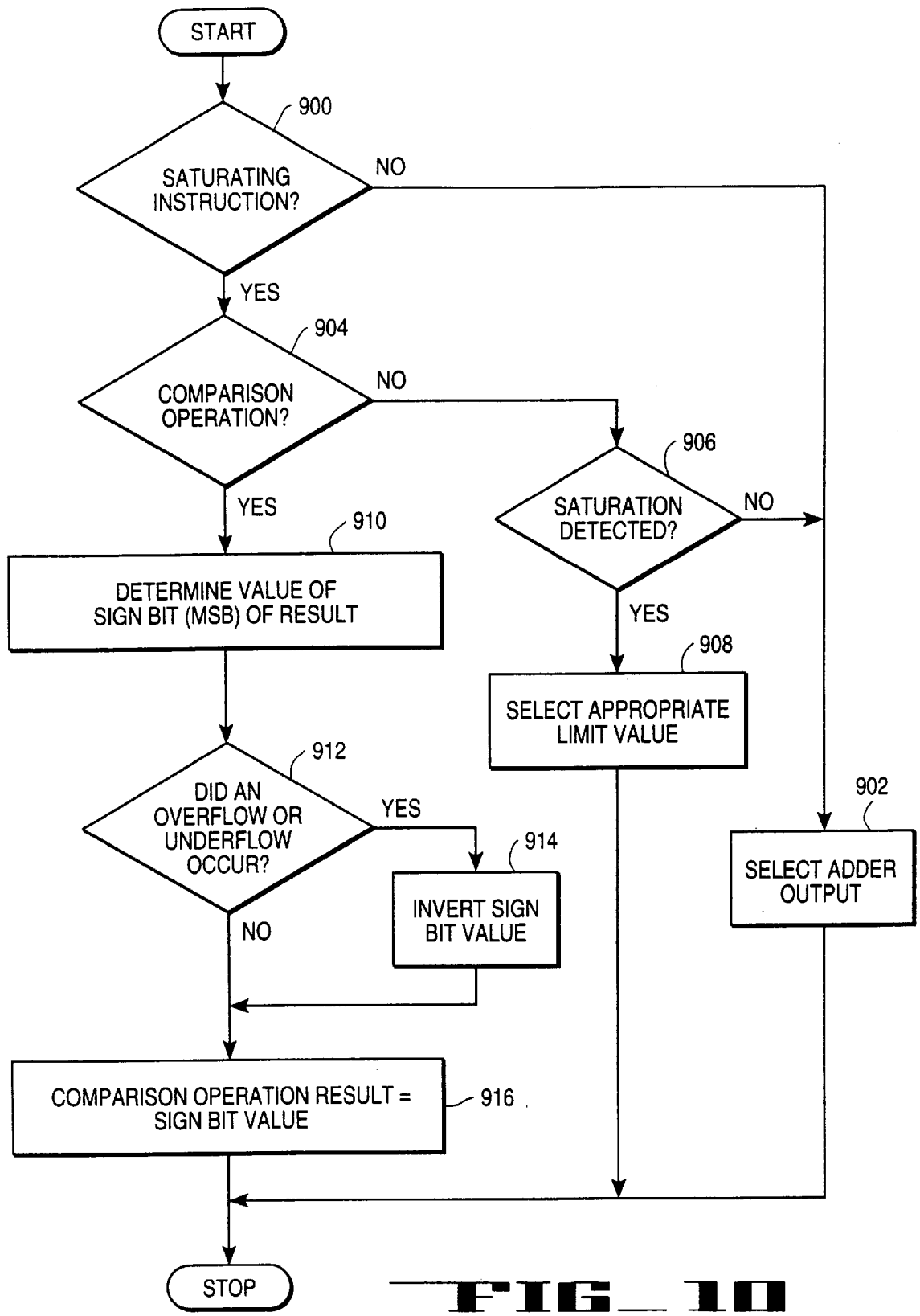
FIG_10

METHOD AND APPARATUS FOR PERFORMING SATURATION INSTRUCTIONS USING SATURATION LIMIT VALUES

BACKGROUND OF THE INVENTION

1. Field of the Invention

The present invention relates to computer systems capable of processing various instructions. More specifically, a system for processing saturating instructions.

2. Background

In typical computer systems, processors are implemented to operate on values represented by a large number of bits (e.g., 64) using instructions that produce one result. For example, the execution of an add instruction will add together a first 64-bit value and a second 64-bit value and store the result as a third 64-bit value. However, multimedia applications require the manipulation of large amounts of data which may be represented in a small number of bits. For example, graphical data typically requires 8 or 16 bits and sound data typically requires 8 or 16 bits. Each of these multimedia application requires one or more algorithms, each requiring a number of operations. For example, an algorithm may require an add, compare and shift operation.

To improve efficiency of multimedia applications (as well as other applications having similar characteristics), prior art processors provide packed data formats. A packed data format is one in which the bits typically used to represent a single value are broken into a number of fixed-size data elements, each of which represents a separate value. For example, a 64-bit register may be broken into two 32-bit elements, each representing a separate 32-bit value. In addition, these prior art processors provide instructions for separately manipulating each element in these packed data types in parallel. For example, a packed add instruction adds together corresponding data elements from a first packed data and a second packed data. Thus, if a multimedia algorithm requires a loop containing five operations that must be performed on a large number of data elements, it is desirable to pack the data and perform these operations in parallel using packed data instructions.

When performing operations on various data types, it may be desirable to provide saturating instructions; i.e., instructions which clamp the result of the operation when the result exceeds the range of permitted values. Clamping means forcing the operation's result to a maximum or minimum value when the result overflows or underflows the range of values permitted for the data format. In the case of underflow, saturation clamps the result to the lowest value in the range and in the case of overflow, to the highest value. The allowable ranges for various data formats are described below. Various types of saturating instructions include signed saturating addition and subtraction, unsigned saturating addition and subtraction, and greater-than comparison instructions.

Saturation instructions are particularly important in multimedia applications to provide accurate representation of audio signals, video signals, and other data. Clamping an operation's result to a maximum or minimum value prevents "wrap-around" of the resulting value. "Wrap-around" refers to the situation where the overflow or underflow generates a result which is inaccurate due to a carry into or out of the most significant bit of the result. Additional details regarding overflow and underflow are provided below. For example, if two values are added together and the result exceeds the maximum value for the data format, the result will "wrap-around" without saturation. The result generated in this example may be smaller than either of the two values added together, a clearly erroneous result. In a multimedia application, if the addition of two values results in an overflow, the result should be clamped to the maximum value (which is closer to the actual result than the "wrap-around" result).

Known systems for processing instructions utilize flags to indicate overflow or underflow conditions. These flags may include an overflow flag, an underflow flag, a carry flag, and flags indicating the type of instruction being executed. Instead of actually clamping the value of the result to a maximum or minimum, these known systems simply set an overflow/underflow flag and allow the result to "wrap-around." Therefore, these systems provide an indication of whether an overflow or underflow occurred, but do not clamp the result to an appropriate maximum or minimum value.

SUMMARY OF THE INVENTION

The present invention provides a system for processing saturating instructions capable of clamping the result of the instruction when the result exceeds the range of permitted values. When an overflow or underflow is detected and saturation is enabled, the invention clamps the operation's result to an appropriate maximum or minimum value for the particular data format. The circuit arrangement provided by the invention increases the overall speed at which instructions are processed by handling various saturating instructions in different manners.

One embodiment of the invention provides a first logic device coupled to receive at least one carry signal and generate an output signal in response to the carry signal. A second logic device is coupled to the first logic device and is capable of selecting between a first plurality of input signals to generate an output signal. The output signal from the second logic device represents the result of the saturation instruction. A third logic device is coupled to the second logic device and receives a second plurality of input signals and generates an output signal. The second plurality of input signals include limit values corresponding to particular data formats.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 1 is a block diagram illustrating an exemplary computer system according to one embodiment of the invention.

FIG. 2 illustrates a register file of the processor shown in FIG. 1.

FIG. 3 is a flow diagram illustrating the general steps performed by the processor to manipulate data.

FIG. 4 illustrates various types of packed data.

FIGS. 5A, 5B, and 5C illustrate in-register packed data representations according to an embodiment of the invention.

FIGS. 6A and 6B illustrate carry operations performed by an adder circuit.

FIG. 7 is a flow diagram illustrating the greater-than comparison operation.

FIG. 8 illustrates a circuit capable of performing the comparison operation of FIG. 7.

FIG. 9 illustrates a circuit capable of generating a proper result based on the operation being performed and the detection of an overflow or underflow condition.

FIG. 10 is a flow diagram illustrating operation of the circuit shown in FIG. 9.

DETAILED DESCRIPTION

The following detailed description sets forth numerous specific details to provide a thorough understanding of the invention. However, those skilled in the art will appreciate that the invention may be practiced without these specific details. In other instances, well known methods, procedures, components, and circuits have not been described in detail so as not to obscure the invention.

The present invention is related to a system for processing saturating instructions capable of clamping the result of the instruction when the result exceeds the range of permitted values. When an overflow or underflow is detected and saturation is enabled, the invention clamps the operation's result to an appropriate maximum or minimum value for the particular data format. The circuit arrangement provided by the invention increases the overall speed at which instructions are processed by handling various saturating instructions in different manners.

Throughout the specification, references are made to various types of packed data formats. These packed data formats are provided to illustrate the invention and an example of an environment in which the invention may operate. Those skilled in the art will appreciate that the invention may be used with a variety of different data formats and is not limited to packed data instructions.

To provide a foundation for understanding the description of the embodiments of the invention, the following definitions are provided.

Bit X through Bit Y:
    defines a subfield of binary number. For example, bit five through bit zero of the byte $00111010_2$ (shown in base two) represent the subfield $111010_2$. The '2' following a binary number indicates base 2. Therefore, $1000_2$ equals $8_{10}$, while $F_{16}$ equals $15_{10}$.

Rx:
    is a register. A register is any device capable of storing and providing data. Further functionality of a register is described below. A register is not necessarily, included on the same die or in the same package as the processor.

SRC1, SRC2, and DEST:
    identify storage areas (e.g., memory addresses, registers, etc.)

Source1-i and Result1-i:
    represent data.

FIG. 1 illustrates an exemplary computer system 100 according to one embodiment of the invention. Computer system 100 includes a bus 101, or other communications hardware and software, for communicating information, and a processor 109 coupled with bus 101 for processing information. Processor 109 represents a central processing unit of any type of architecture, including a CISC or RISC type architecture. Computer system 100 further includes a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also includes a read only memory (ROM) 106, and/or other static storage device, coupled to bus 101 for storing static information and instructions for processor 109. Data storage device 107 is coupled to bus 101 for storing information and instructions.

FIG. 1 also illustrates that processor 109 includes an execution unit 130, a register file 150, a cache 160, a decoder 165, and an internal bus 170. Those skilled in the art will appreciate that processor 109 contains additional circuitry which is not necessary to understanding the invention.

Execution unit 130 is used for executing instructions received by processor 109. In addition to recognizing instructions typically implemented in general purpose processors, execution unit 130 recognizes instructions in packed instruction set 140 for performing operations on packed data formats. Packed instruction set 140 includes instructions for supporting various operations including saturating instructions. An adder circuit is included within processor 109 for performing various addition-related operations. The adder circuit is capable of performing addition, subtraction, and greater-than comparison operations, as discussed in greater detail below. Note that subtraction may be performed by adding the inverse of the number to be subtracted.

Execution unit 130 is coupled to register file 150 by internal bus 170. Register file 150 represents a storage area on processor 109 for storing information, including data. An embodiment of register file 150 is described later with reference to FIG. 2. Execution unit 130 is coupled to cache 160 and decoder 165. Cache 160 is used to cache data and/or control signals from, for example, main memory 104. Decoder 165 is used for decoding instructions received by processor 109 into control signals and/or microcode entry points. In response to these control signals and/or microcode entry points, execution unit 130 performs the appropriate operations. For example, if an add instruction is received, decoder 165 causes execution unit 130 to perform the required addition; if a subtract instruction is received, decoder 165 causes execution unit 130 to perform the required subtraction; etc. Decoder 165 may be implemented using any number of different mechanisms (e.g., a look-up table, a hardware implementation, a PLA, etc.). Thus, while the execution of the various instructions by the decoder and execution unit is represented by a series of if/then statements, it is understood that the execution of an instruction does not require a serial processing of these if/then statements. Rather, any mechanism for logically performing this if/then processing is considered to be within the scope of the invention.

FIG. 1 additionally shows a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer network. Computer system 100 optionally includes video digitizing device 126. Video digitizing device 126 can be used to capture video images that can be transmitted to others on the computer network.

In one embodiment, the processor 109 additionally supports an instruction set which is compatible with the x86 instruction set used by existing processors (such as the Pentium® processor) manufactured by Intel Corporation of Santa Clara, Calif. Thus, in one embodiment, processor 109 supports all the operations supported in the IA™—Intel Architecture, as defined by Intel Corporation of Santa Clara, Calif. (see *Microprocessors,* Intel Data Books volume 1 and volume 2, 1992 and 1993, available from Intel of Santa Clara, Calif.). As a result, processor 109 can support existing x86 operations in addition to the operations of the invention. While the invention is described as being incorporated into an x86 based instruction set, alternative embodiments could incorporate the invention into other instruction sets. For example, the invention could be incorporated into a 64-bit processor using a new instruction set.

FIG. 2 illustrates the register file of the processor according to one embodiment of the invention. The register file 150 is used for storing information, including control/status information, integer data, floating point data, and packed data. In the embodiment shown in FIG. 2, the register file 150 includes integer registers 201, registers 209, status registers 208, and instruction pointer register 211. Status registers 208 indicate the status of processor 109. Instruction pointer register 211 stores the address of the next instruction to be executed. Integer registers 201, registers 209, status registers 208, and instruction pointer register 211 are all coupled to internal bus 170. Any additional registers would also be coupled to internal bus 170. Alternative embodiments may be implemented to contain more or less sets of registers.

The various sets of registers (e.g., the integer registers 201, the registers 209) may be implemented to include different numbers of registers and/or to different size registers. For example, in one embodiment, the integer registers 201 are implemented to store thirty-two bits, while the registers 209 are implemented to store eighty bits (all eighty bits are used for storing floating point data, while only sixty-four are used for packed data). In addition, registers 209 contains eight registers, $R_0$ 212a through $R_7$ 212h. $R_1$ 212a, $R_2$ 212b and $R_3$ 212c are examples of individual registers in registers 209. Thirty-two bits of a register in registers 209 can be moved into an integer register in integer registers 201. Similarly, a value in an integer register can be moved into thirty-two bits of a register in registers 209. In another embodiment, the integer registers 201 each contain 64 bits, and 64 bits of data may be moved between the integer register 201 and the registers 209.

FIG. 3 is a flow diagram illustrating the general steps used by the processor to manipulate data according to one embodiment of the invention. That is, FIG. 3 illustrates the steps followed by processor 109 while performing an operation on packed data, performing an operation on unpacked data, or performing some other operation.

At step 301, the decoder 165 receives a control signal from either the cache 160 or bus 101. Decoder 165 decodes the control signal to determine the operations to be performed. At step 302, Decoder 165 accesses the register file 150, or a location in memory. Registers in the register file 150, or memory locations in the memory, are accessed depending on the register address specified in the control signal. At step 303, execution unit 130 is enabled to perform the operation on the accessed data. At step 304, the result is stored back into register file 150 according to requirements of the control signal.

FIG. 4 illustrates packed data-types according to one embodiment of the invention. Three packed data formats are illustrated; packed byte 401, packed word 402, and packed doubleword 403. Packed byte, in one embodiment of the invention, is sixty-four bits long containing eight data elements. Each data element is one byte long. Generally, a data element is an individual piece of data that is stored in a single register (or memory location) with other data elements of the same length. In one embodiment of the invention, the number of data elements stored in a register is sixty-four bits divided by the length in bits of a data element. Packed word 402 is sixty-four bits long and contains four word 402 data elements. Each word 402 data element contains sixteen bits of information. Packed doubleword 403 is sixty-four bits long and contains two doubleword 403 data elements. Each doubleword 403 data element contains thirty-two bits of information.

FIG. 5a through 5c illustrate the in-register packed data storage representation according to one embodiment of the invention. Unsigned packed byte in-register representation 510 illustrates the storage of an unsigned packed byte 401 in one of the registers $R_0$ 212a through $R_7$ 212h. Information for each byte data element is stored in bit seven through bit zero for byte zero, bit fifteen through bit eight for byte one, bit twenty-three through bit sixteen for byte two, and so on. Thus, all available bits are used in the register. This storage arrangement increases the storage efficiency of the processor. Also, with eight data elements accessed, one operation can now be performed on eight data elements simultaneously. Signed packed byte in-register representation 511 illustrates the storage of a signed packed byte 401. Note that the eighth bit of each byte data element is the sign indicator.

Unsigned packed word in-register representation 512 illustrates how word three through word zero are stored in one register of registers 209. Signed packed word in-register representation 513 is similar to the unsigned packed word in-register representation 512. Note that the sixteenth bit of each word data element is the sign indicator. Unsigned packed doubleword in-register representation 514 shows how registers 209 store two doubleword data elements. Signed packed doubleword in-register representation 515 is similar to unsigned packed doubleword in-register representation 514. Note that the necessary sign bit is the thirty-second bit of the doubleword data element.

As discussed earlier, saturation instructions clamp the result of an operation to a maximum or minimum value when the result either overflows or underflows the range of permissible values. Clamping means setting the result to a maximum or minimum value if the operation result exceeds the range's maximum or minimum value. In the case of underflow, saturation clamps the result to the lowest value in the range and in the case of overflow, to the highest value.

The allowable ranges for various data formats are shown in Table 1.

TABLE 1

| Data Format | Minimum Value | Maximum Value |
|---|---|---|
| Unsigned Byte | 0 | 255 |
| Signed Byte | −128 | 127 |
| Unsigned Word | 0 | 65535 |
| Signed Word | −32768 | 32767 |
| Unsigned Doubleword | 0 | $2^{64}-1$ |
| Signed Doubleword | $-2^{63}$ | $2^{63}-1$ |

For example, using the unsigned byte data format, if an operation's result is 258 and saturation is enabled, then the result is clamped to 255 before being stored into the operation's destination register. Similarly, if an operation's result is −32999 and processor 109 uses signed word data format with saturation enabled, then the result is clamped to −32768 before being stored into the operation's destination register.

As illustrated above in Table 1, data may be represented in either signed or unsigned format. Furthermore, the operations performed on signed or unsigned data may be designated as either saturating or non-saturating operations. Examples of operations which may be performed with saturating enabled or disabled include addition and subtraction. Additionally, the greater-than comparison operation generates either a true result (all data bits are set to one) or a false result (all data bits are set to zero).

A particular instruction itself indicates whether it is a saturating instruction or a non-saturating instruction. The instruction decoder 165 (shown in FIG. 1) generates an instruction indicating whether the particular instruction is a saturating instruction. The instruction itself also indicates the data format on which the instruction operates; e.g., byte, word, or doubleword.

When performing an operation with saturation enabled, the result of the operation must be tested for an overflow or underflow condition. Signed overflow can only occur when two positive numbers are added together. Similarly, signed underflow can only occur when a negative number is added to another negative number. The most significant bit (MSB) of a signed number represents the sign associated with the number. Typically, if the MSB=0, then the number is positive, and if the MSB=1, the number is negative.

When adding two positive numbers (MSB=0), the result must be positive. However, if an overflow occurs, a one is carried into the MSB of the result, indicating a negative number. In this overflow situation, the two positive numbers each had a MSB=0. Therefore, a one is carried into the MSB of the result, but there is no carry out from the MSB of the result. This situation is illustrated in FIG. 6A, where two positive numbers are added together, but the result indicates a negative number (MSB=1). Since it is impossible to obtain a negative number as a result of adding two positive numbers, the result shown in FIG. 6A is erroneous. Although a one is carried into the MSB of the result, there is no carry out from the MSB. Therefore, an overflow condition has occurred and the result must be clamped to the maximum value before storing the result into the operation's destination register.

As mentioned above, an overflow condition requires both a carry into the MSB of the result and the absence of a carry out from the MSB. A carry into the MSB alone does not necessarily indicate an overflow condition. FIG. 6B illustrates a situation where a positive number is added to a negative number. In this situation, a one is carried into the MSB of the result and a one is also carried out of the MSB. This does not result in an overflow, because the addition of a positive number and a negative number cannot produce an overflow condition. Thus, a signed overflow condition can only occur when a one is carried into the MSB of the result and a one is not carried out of the MSB.

When adding a negative number to another negative number, the result must be negative. If an underflow occurs, the MSB of the result will indicate a positive number. Using an analysis similar to that above with respect to a signed overflow, a signed underflow condition occurs when there is no carry into the MSB, but a one is carried out of the MSB. Since both numbers are negative, each number's MSB is a one. If the result of the addition operation has a MSB=0, then an underflow has occurred.

When performing an unsigned operation with saturation enabled, the result of the operation must be tested for an overflow or underflow condition. As illustrated in Table 1, when operating on unsigned numbers, negative results are not permitted. Therefore, any result having a negative value is clamped to zero. Unsigned overflow can only occur when two unsigned numbers are added together. Since unsigned numbers do not have a sign bit, the MSB of the unsigned number is part of the number being represented. An unsigned overflow occurs when a one is carried out of the MSB, indicating that the number of bits present is not sufficient to represent the result.

Similarly, unsigned underflow can only occur when subtracting two unsigned numbers. When subtracting two unsigned numbers, there will always be a carry out from the MSB if the result is valid. Thus, unsigned underflow occurs when there is no carry from the MSB.

Based on the above discussions, the determination of whether a signed overflow or a signed underflow has occurred may be illustrated by the following equation:

$$\text{Signed overflow/underflow} = C_{in} \text{ XOR } C_{out}$$

where $C_{in}$ represents the existence of a carry into the MSB, $C_{out}$ represents the existence of a carry out from the MSB, and XOR is the Exclusive-OR function. Both the $C_{in}$ and $C_{out}$ signals are generated by an adder circuit as a result of an addition operation. This equation is illustrated by the following table:

TABLE 2

| $C_{in}$ | $C_{out}$ | $C_{in}$ XOR $C_{out}$ |
|---|---|---|
| 0 | 0 | 0 |
| 0 | 1 | 1 |
| 1 | 0 | 1 |
| 1 | 1 | 0 |

The first row of Table 2 illustrates the situation where there is no carry in and no carry out, thereby generating zero as a result. The resulting zero indicates a valid result; i.e., no overflow or underflow occurred. The second row of Table 2 illustrates an underflow situation; i.e., where there is a carry out, but no carry in. In the case of an underflow or an overflow, the XOR function in the third column generates a result of one. The third row of Table 2 illustrates an overflow situation. The fourth row of Table 2 illustrates a valid result; i.e., no overflow or underflow.

As mentioned above, another operation which provides for saturation is the signed greater-than comparison operation (referred to as the comparison operation), illustrated as follows:

Comparison Operation: A>B

This comparison operation is alternatively illustrated in the following forms:

A−B>0

A+(−B)>0

A+(NOT B+1)>0

A+NOT B>−1

A+NOT B≧0

Note that (−B) may be represented in 2's complement form as (NOT B+1). Since the comparison operation can be represented as A+NOT B≧0, the sign bit may be used to determine the result of the comparison. If the MSB (the sign bit) is zero, indicating a positive result (≧0), then the comparison is true. If the MSB is one, indicating a negative result, then the comparison is false. However, the value of the MSB is not accurate if an overflow or underflow occurred as a result of the operation (A+NOT B). If an overflow or underflow is detected, then the sign bit is incorrect and is indicating the opposite value of the proper result.

Referring to FIG. 7, a flowchart illustrates the procedure used to determine the proper result of a greater-than comparison operation. At step 700, the value of the sign bit (MSB) of the initial result from the adder circuit is determined. As discussed above, the sign bit is used to determine the result of the comparison operation. At step 702, a determination is made regarding whether an overflow or an underflow occurred. As discussed above, this determination is made using the formula $C_{in}$ XOR $C_{out}$. If an overflow or underflow occurred, then the procedure branches to step 704 where the value of the sign bit is inverted. Otherwise, the procedure branches to step 706 where the final result of the comparison operation is set equal to the value of the sign bit.

The determination of the result of the comparison operation may be illustrated using the following formula:

Comparison=Sign Bit XNOR($C_{in}$ XOR $C_{out}$)

Referring to FIG. 8, a circuit is shown for implementing the greater-than comparison operation as described above. A multiplexer 800 includes a select line 802, an output line 804, and a pair of input lines 806 and 808. An Exclusive-OR gate 810 receives signals $C_{in}$ and $C_{out}$ and generates an output a signal coupled to input line 808 of multiplexer 800. Signals $C_{in}$ and $C_{out}$ are generated by an adder circuit (not shown) as a result of an addition, subtraction, or greater-than comparison operation. The output of XOR gate 810 is also coupled to inverter 812 having an output coupled to input line 806 of multiplexer 800. The sign bit generated as a result of the ($C_{in}$ XOR $C_{out}$) calculation is provided to multiplexer select line 802. Therefore, when the sign bit is zero, the input on line 806 is selected, and when the sign bit is one, the input on line 808 is selected.

As discussed above, the comparison operation (A+NOT B) utilizes the MSB of the result generated by the adder circuit to determine whether the comparison is true or false. The comparison operation requires the use of an adder circuit to determine the result. When an adder circuit adds two numbers, the MSB is the last bit to be generated by the adder. Therefore, the greatest delay is incurred while waiting for the MSB of the result. Since the comparison operation requires the MSB, it is important to maximize the speed at which the comparison circuitry receives and processes the MSB. As illustrated in FIG. 8, the MSB (sign bit) is used as the select line for multiplexer 800. Thus, upon generation of the MSB, multiplexer 800 can immediately select the proper input signal and generate the corresponding output signal.

FIG. 9 illustrates a circuit for selecting a proper output based on the operation being performed and the detection of an overflow or underflow condition. The circuit illustrated increases the overall processing speed by increasing the speed of the comparison operation while decreasing the speed of the signed and unsigned overflow and underflow operations. A multiplexer 850 is coupled to an Exclusive-OR gate 852 and an inverter 854 as shown in FIG. 8. Multiplexer 850 includes three select lines 856, 858 and 860 for selecting among three inputs 862, 864, and 866. The signal on select line 856 selects input 862. The signal on select line 858 selects input 864. Finally, the signal on select line 860 selects input 866. The signal on select line 856 is generated by AND gate 855, and the signal on select line 858 is generated by AND gate 857.

Multiplexer 850 generates an output based on the instruction being performed, the data type, and whether the instruction saturated. If a signed comparison operation is being performed (indicated by COMPARE), then one of the inputs 862 or 864 will be selected as the output of multiplexer 850. In this situation, the function on select line 860, NOT COMPARE, will be false, thereby selecting input 862 or 864. When COMPARE is true, the value of the sign bit (MSB) will pass through AND gate 857 and the inverted value of the sign bit (MSB) will pass through AND gate 855. Thus, when a comparison operation is being performed, the appropriate output will be selected from input 862 or 864, representing the result of the comparison.

If a comparison operation is not being performed, then COMPARE is false and NOT COMPARE is true. In this situation, select line 860 selects input 866, thereby ignoring the signals on inputs 862 and 864. The signal on input 866 is generated by a multiplexer 868 in response to a select signal on line 870 and a plurality of input signals to the multiplexer. The input signals provided to multiplexer 868 include the initial result from the adder circuit (i.e., the result from the adder prior to detecting saturation) and the saturation limit values for various data formats, as illustrated in Table 1. The select signal provided on line 870 indicates the proper input to select based on the instruction being performed and whether saturation occurred. As discussed earlier, saturation occurs when an overflow or underflow condition occurs, and may be detected by using the procedures and formulas discussed above. If saturation does not occur, then select line 870 selects the adder result as the output for multiplexer 868. However, if saturation occurs, then select line 870 selects the proper saturation limit value depending on the data format used for the instruction being performed. For example, if an addition operation is being performed on two signed bytes and an overflow occurs, then the saturation limit value of 127 is selected as the output from multiplexer 868. The saturation limit values provided as inputs to multiplexer 868 represent all possible upper and lower limit values for all data formats utilized by the system.

As illustrated in FIG. 9, the comparison operation requires fewer levels of logic than required by the signed and unsigned overflow and underflow operations. This produces a faster result for the comparison operation which must wait for the generation of the MSB from the adder circuit. Although the signed and unsigned overflow/underflow operations are performed slower as a result of the additional level of logic, the values necessary to perform these operations are typically generated before the generation of the MSB from the adder circuit. Since the necessary values for these operations are generated faster, the operations are started before the MSB is generated, thereby compensating for the additional level of logic. Therefore, the overall speed of the circuit is increased by the arrangement illustrated in FIG. 9.

Referring to FIG. 10, a flow diagram illustrates the operation of the circuit shown in FIG. 9. Step 900 determines whether the instruction being processed is a saturating instruction or a non-saturating instruction. If a non-saturating instruction is being processed, then the initial output of the adder is selected at step 902 without any additional processing. If a saturating instruction is being processed, then step 904 determines whether a comparison operation is being executed. If the operation is not a comparison, then the routine branches to step 906 where saturation detection is performed. Saturation detection (overflow or underflow) may be performed using the procedures and circuits discussed above. If a saturation condition is detected at step 906 then the appropriate limit value is selected at step 908, and the operation is complete. Examples of limit values for various data formats are illustrated in Table 1 above. If the operation result is non-saturating, then step 906 branches to step 902 where the output of the adder is selected as the operation result.

If step 904 determines that a comparison operation is executed, then step 910 determines the value of the sign bit (MSB) of the initial result. The remaining steps 912, 914, and 916 operate in a manner similar to that described with respect to FIG. 7.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. In a computer system, a method for processing instructions comprising steps of:

receiving an instruction;

determining that said instruction is either a saturating instruction or a non-saturating instruction;

if said instruction is a saturating instruction, then generating a result by determining a type of operation being executed and detecting whether a saturation condition occurred, wherein the result generated is a limit value associated with a particular data format;

otherwise, generating a result by selecting an actual output of the instruction being executed.

2. The method of claim 1 wherein said step of generating a result by determining a type of operation being executed and detecting whether a saturation condition occurred comprises steps of:

determining whether a comparison operation was executed;

if a comparison operation is being executed, then determining whether a saturation condition occurred and generating said result in response to a sign bit contained in an initial operation result;

otherwise, selecting an appropriate result by detecting whether a saturation condition occurred.

3. The method of claim 2 wherein the step of determining whether a saturation condition occurred comprises steps of:

determining a value of a sign bit associated with an initial operation result;

determining whether a saturation condition occurred;

if a saturation condition occurred, then inverting the sign bit associated with the initial operation result, wherein the inverted sign bit indicates a final result of the comparison operation;

otherwise, the sign bit associated with the initial operation result is a final result of the comparison operation.

4. The method of claim 2 wherein the step of selecting an appropriate result by detecting whether a saturation condition occurred comprises steps of:

detecting whether a saturation condition occurred;

if a saturation condition occurred, then selecting an appropriate limit value as a result of the instruction executed.

5. An apparatus for processing saturation instructions in a computer system comprising:

a first logic device coupled to receive at least one carry signal, said first logic device generating an output signal responsive to said carry signal;

a second logic device coupled to said first logic device, wherein said second logic device is capable of selecting between a first plurality of input signals to generate an output signal, said output signal representing a result of said saturation instruction; and a third logic device coupled to said second logic device, wherein said third logic device is coupled to receive a second plurality of input signals and to generate an output signal, said second plurality of input signals including limit values corresponding to particular data formats.

6. The apparatus of claim 5 wherein said first logic device receives a pair of carry signals generated by an adder.

7. The apparatus of claim 5 wherein said first logic device is an Exclusive-OR gate.

8. The apparatus of claim 5 wherein said carry signal identifies carry bits generated during an addition operation.

9. The apparatus of claim 5 wherein said carry signal indicates whether a saturation condition occurred during an addition operation.

10. The apparatus of claim 5 wherein said second logic device is a multiplexer.

11. The apparatus of claim 5 wherein said second logic device selects between said first plurality of input signals based on a sign bit generated by an adder.

12. The apparatus of claim 5 wherein said second logic device selects between said first plurality of input signals in response to a sign bit generated by an adder and a signal indicating a type of operation being performed.

13. The apparatus of claim 5 wherein said third logic device selects between said second plurality of input signals in response to signals indicating a type of operation being performed and a saturation condition.

14. The apparatus of claim 5 wherein said third logic device is a multiplexer.

15. An apparatus for processing an instruction in a computer system comprising:

means for receiving carry signals generated by an adder;

means for determining whether said instruction is either a saturating instruction or a non-saturating instruction;

means for generating a result based on an instruction type and a saturation condition if said instruction is a saturating instruction, wherein the result is a limit value associated with a particular data format; and means for generating a result based on an actual output of the instruction if said instruction is a non-saturating instruction.

\* \* \* \* \*